United States Patent
Hagiwara

(10) Patent No.: US 6,810,457 B2
(45) Date of Patent: Oct. 26, 2004

(54) PARALLEL PROCESSING SYSTEM IN WHICH USE EFFICIENCY OF CPU IS IMPROVED AND PARALLEL PROCESSING METHOD FOR THE SAME

(75) Inventor: Takashi Hagiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 443 days.

(21) Appl. No.: 09/897,885

(22) Filed: Jul. 5, 2001

(65) Prior Publication Data

US 2002/0004868 A1 Jan. 10, 2002

(30) Foreign Application Priority Data

Jul. 5, 2000 (JP) .................................... 2000-203173

(51) Int. Cl.[7] .............................................. G06F 13/14
(52) U.S. Cl. ........................ 710/242; 709/253; 710/112
(58) Field of Search ............................... 709/253, 225; 710/305, 112, 240–242; 711/141, 138, 137, 118, 117

(56) References Cited

U.S. PATENT DOCUMENTS

| 5,907,485 A | * | 5/1999 | Van Loo et al. ............... 700/3 |
| 6,347,361 B1 | * | 2/2002 | Arimilli et al. ............ 711/141 |
| 6,546,429 B1 | * | 4/2003 | Baumgartner et al. ...... 709/253 |

FOREIGN PATENT DOCUMENTS

| JP | 2-64838 | 3/1990 |
| JP | 4-18500 | 3/1992 |
| JP | 5-327705 | 12/1993 |
| JP | 7-93170 | 4/1995 |

* cited by examiner

Primary Examiner—Mark H. Rinehart
Assistant Examiner—Clifford Knoll
(74) Attorney, Agent, or Firm—Young & Thompson

(57) ABSTRACT

A parallel processing system includes a network and a plurality of nodes which communicates asynchronously between the plurality of nodes through the network. Each of the plurality of nodes may include a plurality of CPUs and a communication control unit. Each of the plurality of CPUs as an issuing CPU generates and transmits an asynchronous communication request, retransmits the asynchronous communication request in response to a non-acceptance reply, and executes a subsequent process in response to an acceptance replay. The communication control unit determines whether the asynchronous communication request is acceptable, returns the acceptance reply to the issuing CPU when the asynchronous communication request is acceptable, and the non-acceptance reply to the issuing CPU when the asynchronous communication request is not acceptable, and executes the asynchronous communication request.

20 Claims, 8 Drawing Sheets

ACCEPTANCE REPLY VALUE | 000000000 ⋯ 0000 |  21

NON-ACCEPTANCE REPLY VALUE | 000000000 ⋯ 00FF | 22

PARALLEL PROCESSING SYSTEM IN WHICH USE EFFICIENCY OF CPU IS IMPROVED AND PARALLEL PROCESSING METHOD FOR THE SAME

BACKGROUND OF THE INVENTION

1. Field of the Invention

The present invention relates to a parallel processing system and a parallel processing method.

2. Description of the Related Art

As a high speed operation computer system like a supercomputer, a high speed parallel computer system is known in which one job is divided into a plurality of processes (tasks), and a plurality of processors cooperate and execute the tasks in parallel. Thus, a limit of performance improvement of a single processor can be overcome. A conventional parallel computer system called a perfectly distributed memory parallel computer system is composed of nodes connected by a dedicated network. Each of the nodes is composed of processors or CPUs, a memory, and a communication control unit (CCU). Communication between nodes is carried out via the network. Also, in recent years, a distributed sharing memory type parallel computer system (cluster type parallel computer system) is known in which the overhead for the parallel processing is less such as the easiness of the programming and internode data transfer. In such a parallel computer system, the node is composed of SMP (Symmetric Multiple Processor) and a communication control unit, and a memory is shared by a plurality of processors in the range with appropriate implementing cost.

In these distributed memory type parallel computer systems, the internode communication processing time is large, compared with a calculation processing time in the node. Therefore, the internode communication processing time transfer and the calculation processing are overlapped in the CPU, and an asynchronous communication data instruction is completed when a CPU issues the asynchronous communication instruction. Thus, the communication processing time is concealed and the subsequent process and interrupt process can be executed without waiting for the completion of the asynchronous communication instruction.

Conventionally, a coprocessor is provided separately from a CPU, and communication processing is requested from a user program to an operating system (OS) by a system call from the viewpoint of hardware resource control, as in input/output processing. Thus, the communication processing is executed asynchronously from the CPU. However, this system call requires large software overhead so that the performance improvement of the parallel processing system is hindered.

For this reason, the technique is often adopted in which an asynchronous transfer instruction can be issued directly from the user program. When only the OS controls the asynchronous communication instruction, it is possible to ask the OS to control the asynchronous communication instructions such that the hardware resources are not fully consumed. However, when the asynchronous transfer instructions is issued directly from the user program, a flow control of the asynchronous transfer instructions is necessary to protect the system from the system performance degradation due to the hardware resource control overhead.

Conventionally, as such a flow control, a hand-shaking system is known in which when the CCU receives an asynchronous communication request from the CPU, the CCU notifies the reception of the request to the CPU. When a hand-shaking reply is notified, the CPU interprets the hand-shaking reply as the completion of the asynchronous communication instruction and starts the issuance of a subsequent instruction and an interruption process.

In the hand-shaking system, as shown in FIGS. 8 and 9, when a request buffer of the CCU 101 is full, the CCU 101 does not return the hand-shaking reply to the CPU 102 until the entry is ensured in the request buffer (Steps S102, 103 and 104). Since the asynchronous communication instruction does not complete, the CPU cannot release an interrupt prohibition state. Therefore, there is a problem that the use efficiency of the CPU is reduced remarkably. Especially, in the parallel computer system which several hundreds of nodes are connected via an interconnection network, it is expected that it takes a very long time until an entry is ensured in the request buffer depending on the communication state on the interconnection network.

In conjunction with the above description, a communication control apparatus is disclosed in Japanese Laid Open Patent application (JP-A-Heisei 2-64838). In this reference, a plurality of communication control apparatuses are connected to a host apparatus. The communication control apparatus is composed of a reception buffer receiving and temporarily storing data in accordance with an instruction from the host apparatus. A first section sets a reception buffer full notice flag when reception data are stored in the reception buffer more than a first predetermined quantity, and resets the reception buffer full notice flag when the reception data are stored in the reception buffer less than a first predetermined quantity which is less than the first predetermined quantity. A flag setting section checks the reception buffer full notice flag when transmitting a transmission frame in response to a transmission instruction from the host apparatus, sets a predetermined bit to "1" of a control section of the transmission frame when the flag is set, and to "0" when the flag is reset, and transmits the transmission frame. A second section receives the transmission frame, sets the reception buffer full notice flag when the predetermined bit of the control section is set to "1", and resets the reception buffer full notice flag when the predetermined bit of the control section is set to "0". A report section checks the reception buffer full notice flag when a transmission instruction is received from the host apparatus, do not receive transmission data from the host apparatus when the flag is set, and reports that the data are stored in the reception buffer more than the first predetermined quantity.

Also, a communication control system is disclosed in Japanese Laid Open Patent Application (JP-A-Heisei 4-18500). In this reference, the communication control system is composed of a plurality of communication units communicating with each other. The control unit is composed of a communication control section connected to a transmission path and a main control section communicating with the other communication units via the communication control unit. A first reception buffer is provided to store reception data to the main control section, and a second reception buffer is provided to store reception data to the communication control section. A common memory is provided for the main control section and the communication control section. The main control section sets a reception stop flag to the common memory when the first reception buffer is full. The communication control section stores the reception data in the second reception buffer depending on the reception stop flag. The communication control section transmits a transmission stop signal when the second reception buffer is full and sets a transmission stop signal transmission flag. The transmission control section sets a first transmission stop flag to the common memory when the transmission buffer is full. The main control section stops sending of the transmission data to the communication control section depending on the first transmission stop flag. The main control section resets the reception stop flag when the first reception buffer is not full, and sends an interrupt signal to the communication control section. The communication control section transfers the data from the second reception buffer to the first reception buffer in response to the interrupt signal. The communication control section transmits a transmission permission signal when the reception stop flag is reset and the transmission stop signal transmission flag is set. When a transmission stop signal is received from another unit, the communication control section is sets the second transmission stop flag and stops the transmission of the transmission data to the other unit. When the transmission permission signal is received from another unit, the communication control section resets the second transmission stop flag and restarts the transmission.

Also, a broadcast communication system is disclosed in Japanese Laid Open Patent application (JP-A-Heisei 5-327705). In this reference, data is transmitted from a host computer to a channel via at least two data buffers. A queue buffer (an area in which the host computer registers a communication processing request) is provided in the channel control module to control the nearest data buffer to a channel. For broadcasting of same data (broadcasting data) from the host computer to a plurality of terminals, in a CPU of the host computer are provided a section for detecting an empty state of the queue buffer, a section for stopping registration of a broadcasting data transmission instruction in the queue buffer when the queue buffer is full, a section for notifying a terminal to an application program, the registration of the broadcasting data transmission instruction for the terminal being stopped.

Also, a communication buffer control apparatus is disclosed in Japanese Laid Open Patent application (JP-A-Heisei 7-93170). In this reference, the communication buffer control apparatus is composed of a buffer remaining quantity table which stores an available remaining buffer quantity, and a task use buffer quantity table which stores a task use buffer quantity which is allocated to every task based on the remaining buffer quantity. When the remaining buffer quantity becomes smaller than a predetermined minimum value or a buffer quantity used by a task becomes larger than another upper limit value, the use of the above remaining buffer is stopped and it is notified to a requesting task. When the remaining buffer quantity becomes larger than a predetermined minimum value and the buffer quantity used by each task becomes smaller than the upper limit value, the use of the remaining buffer is restarted. Thus, fair communication service is given to a plurality of communications links which require processing at the same time. The reception is restarted after a temporal reception stop due to fullness of the buffer. Moreover, the detection of the buffer control fault due to a fault of a communication control system gets easy.

SUMMARY OF THE INVENTION

An object of the present invention is to provide a parallel processing system and a parallel processing method in which the use efficiency of a CPU can be improved.

In an aspect of the present invention, a parallel processing system includes a network and a plurality of nodes which communicates asynchronously between the plurality of nodes through the network. Each of the plurality of nodes may include a plurality of CPUs and a communication control unit. Each of the plurality of CPUs as an issuing CPU generates and transmits an asynchronous communication request, retransmits the asynchronous communication request in response to a non-acceptance reply, and executes a subsequent process in response to an acceptance reply. The communication control unit determines whether the asynchronous communication request is acceptable, returns the acceptance reply to the issuing CPU when the asynchronous communication request is acceptable, and the non-acceptance reply to the issuing CPU when the asynchronous communication request is not acceptable, and executes the asynchronous communication request.

Here, the communication control unit has a request buffer, and the communication control unit determines that the asynchronous communication request is acceptable, when the request buffer is not full, and determines that the asynchronous communication request is not acceptable, when the request buffer is full.

In this case, the communication control unit may store the asynchronous communication request in the request buffer when the asynchronous communication request is acceptable. Also, the communication control unit may discard the asynchronous communication request when the asynchronous communication request is not acceptable.

Also, the issuing CPU enters a waiting mode after transmitting the asynchronous communication request to the communication control unit, and the issuing CPU is in an interrupt prohibition state in the waiting mode.

Also, the issuing CPU may include an instruction issuing control section which generates and transmits the asynchronous transfer request to the communication control unit, and a reply receiving register which receives the acceptance reply or the non-acceptance reply from the communication control unit. In this case, the instruction issuing control section of the issuing CPU sets the issuing CPU to a waiting mode in which reception of an interrupt is prohibited, after transmitting the asynchronous communication request to the communication control unit. The reply receiving register releases the waiting mode when the acceptance reply is received from the communication control unit.

Also, the communication control unit may include a request control section and a communication executing section. The request control section determines whether the asynchronous communication request is acceptable, and returns the acceptance reply to the issuing CPU when the asynchronous communication request is acceptable, and the non-acceptance reply to the issuing CPU when the asynchronous communication request is not acceptable. The communication executing section receives the asynchronous communication request and executes the asynchronous communication request.

In this case, the request control section may include a request receiving section which receives the asynchronous transfer request from the issuing CPU; a determining section which determines whether the asynchronous transfer request is acceptable; and a request control section which has the request buffer, and stores the asynchronous transfer request in the request buffer when the asynchronous transfer request is determined to be acceptable by the determining section.

In another aspect of the present invention, a parallel processing method may include a plurality of node, each of which may include a plurality of CPUs and a communication control unit, the parallel processing method may be attained by (a) issuing an asynchronous communication request from one of the plurality of CPUs as an issuing CPU;

by (b) setting the issuing CPU to a waiting state such that process change is prohibited, after the issuance; by (c) determining, in the communication control unit, whether the asynchronous communication request is acceptable; by (d) returning an acceptance reply from the communication control unit to the issuing CPU when the asynchronous communication request is acceptable; and by (e) releasing the issuing CPU from the waiting state in response to the acceptance reply.

Here, the parallel processing method may further include (f) executing a subsequent process in response to the acceptance reply.

Also, the parallel processing method may further includes (g) returning a non-acceptance reply from the communication control unit to the issuing CPU when the asynchronous communication request is not acceptable; and (h) reissuing the asynchronous communication request from the issuing CPU to the communication control unit in response to the non-acceptance reply.

Also, the parallel processing method may further include (i) executing the asynchronous communication request.

Also, the (c) determining step may be attained by determining that the asynchronous communication request is acceptable, when a request buffer in the communication control unit is not full; and by storing the asynchronous communication request in the request buffer when the request buffer is not full.

Also, the (c) determining step may be attained by determining that the asynchronous communication request is not acceptable, when a request buffer in the communication control unit is full; and by discarding the asynchronous communication request when a request buffer in the communication control unit is full.

DESCRIPTION OF THE PREFERRED EMBODIMENTS

Hereinafter, a parallel processing system of the present invention will be described below in detail with reference to the attached drawings.

Figure 1:
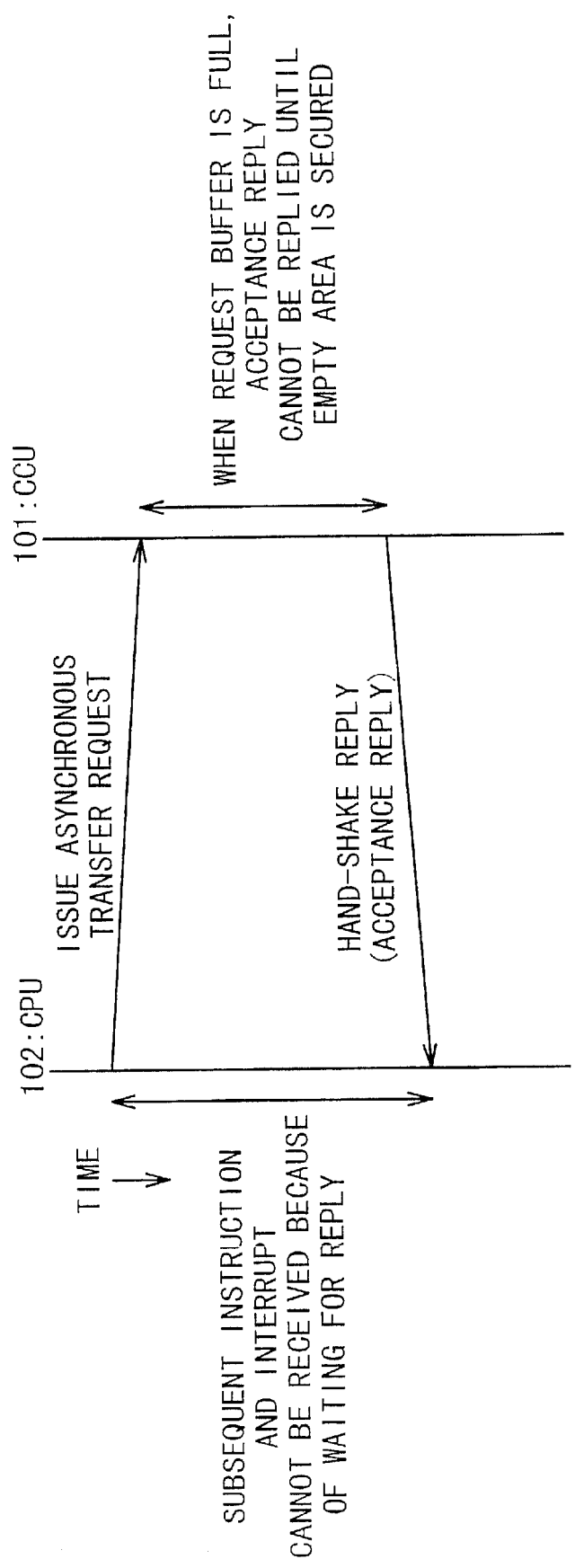
FIG. 1 is a sequence diagram showing an operation of a conventional parallel processing system.
Figure 2:
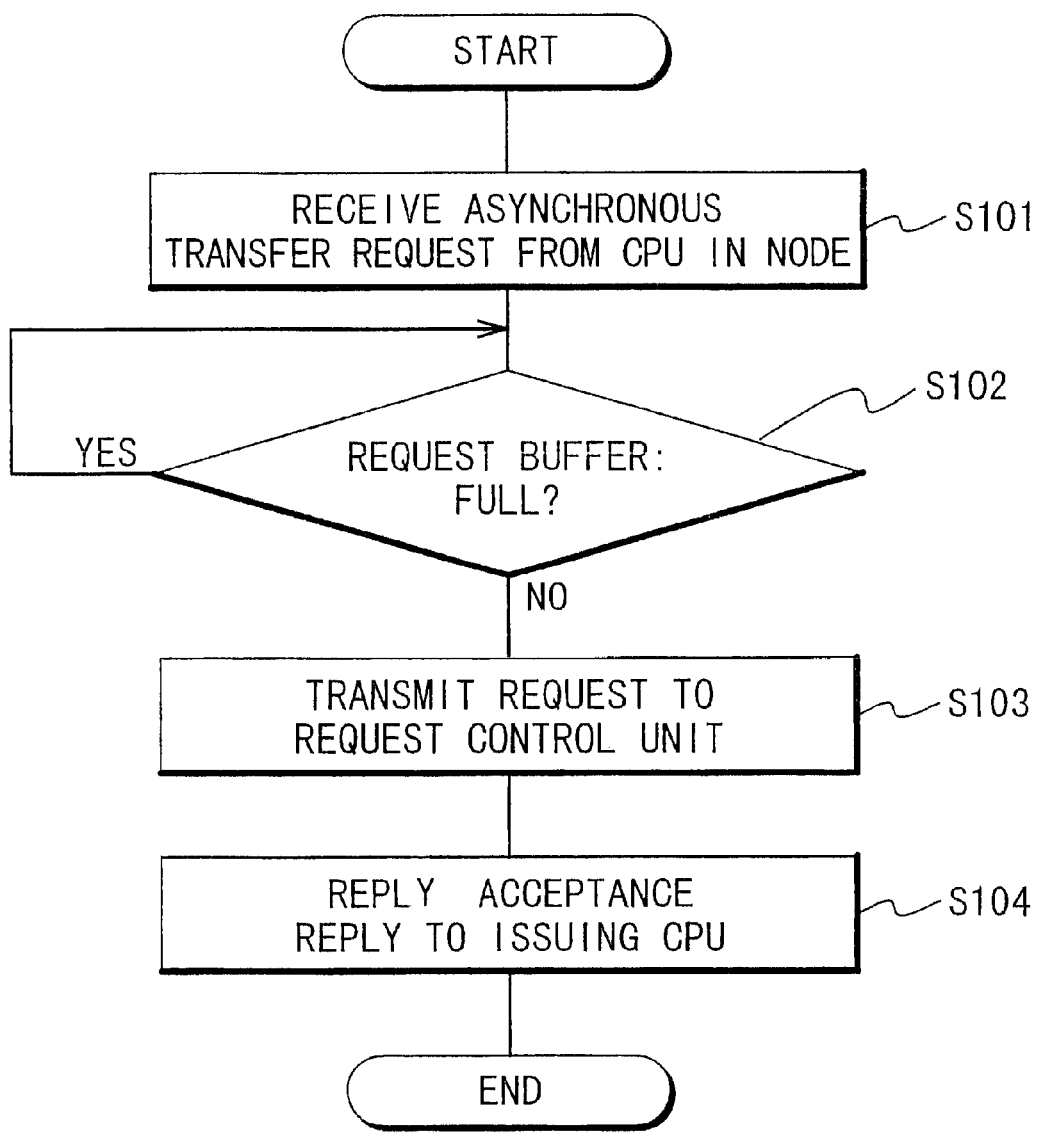
FIG. 2 is an operation flow showing asynchronous communication in the conventional parallel processing system.
Figure 3:
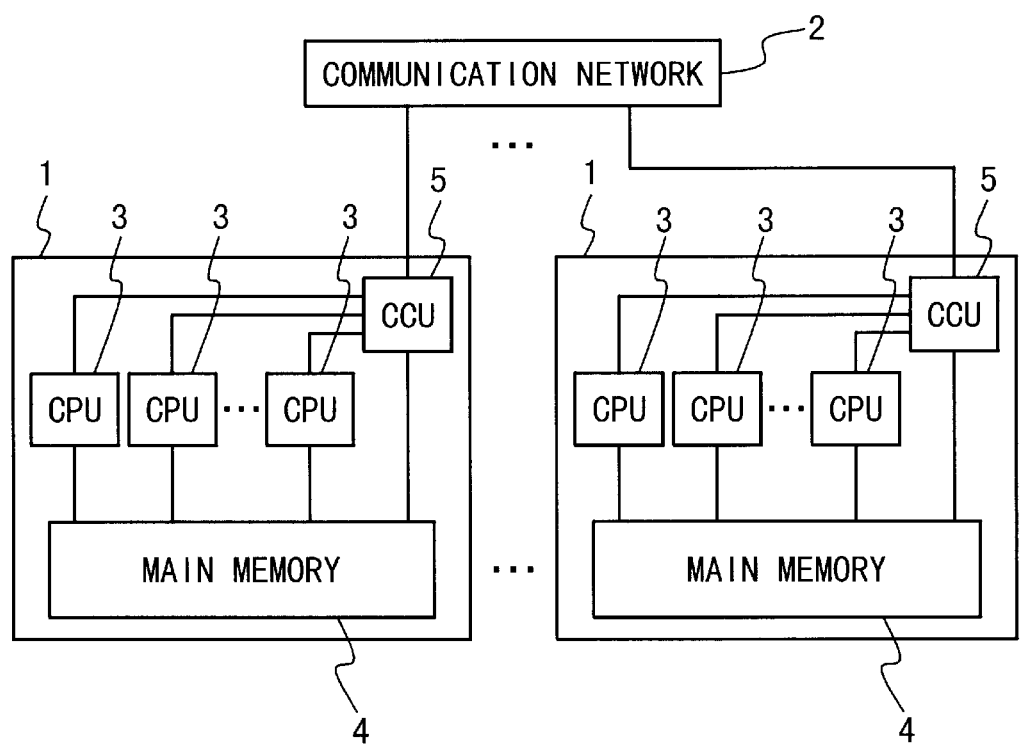
FIG. 3 is a circuit block diagram showing the structure of a parallel processing system according to an embodiment of the present invention.

FIG. 3 is a block diagram showing the structure of the parallel processing system according to the embodiment of the present invention. The parallel processing system is composed of a plurality of nodes 1 connected to each other via a communication network. The node 1 is composed of one or more CPUs 3, a main memory 4 shared by the CPUs 3 and a communication control unit (CCU) 5 for controlling communication between the nodes.

Figure 4:
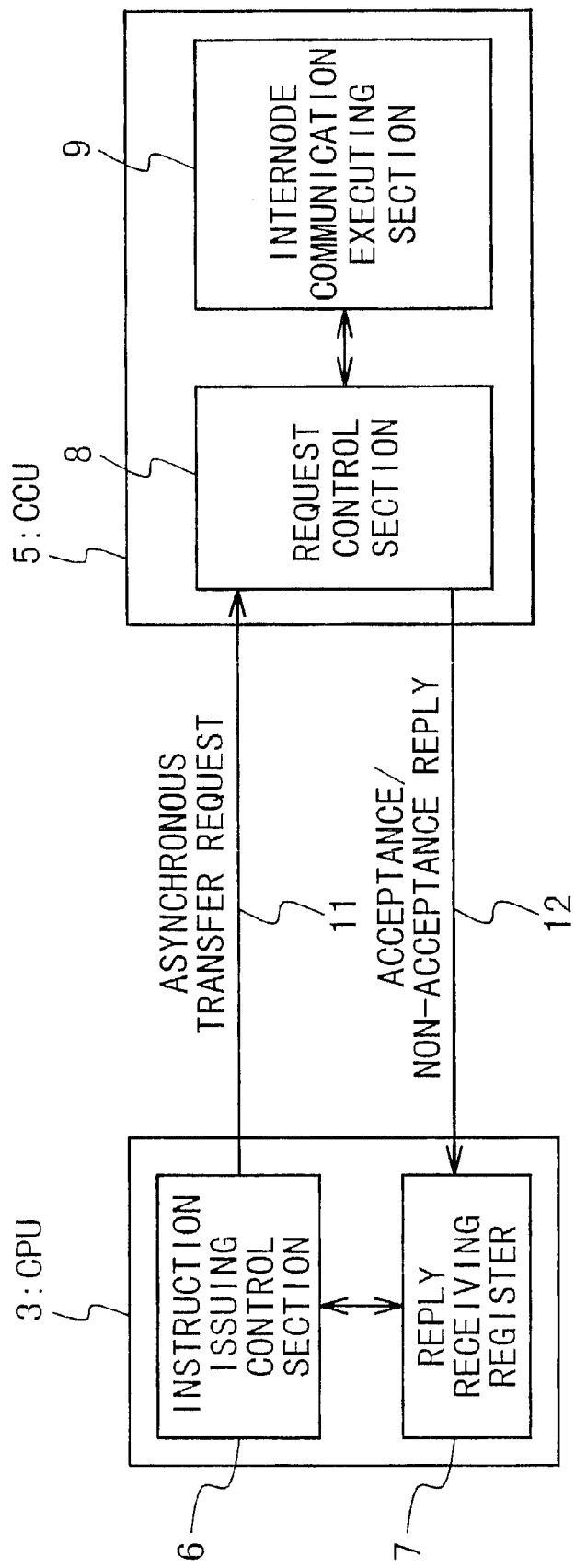
FIG. 4 is a circuit block showing the structure of a CPU and a communication control unit in the parallel processing system according to the embodiment of the present invention.

FIG. 4 shows a relation between an optional CPU 3 and the CCU 5 in the node 1. The CPU 3 is composed of an instruction issuing control section 6 which decodes a usual operation instruction and an internode communication instruction and controls the issuance of the instruction, and a reply receiving register 7 which stores replies received from the CCU 5. As the reply receiving register 7, a general purpose register can be used. The CCU 5 is composed of a request control section 8 and an internode communication executing section 9 which executes internode communication. The request control section 8 receives an asynchronous communication request 11 from each CPU in the node. Then, the request control section 8 returns an acceptance reply or a non-acceptance reply 12 to the CPU 3 as the issuing source of the asynchronous communication request based on the state of the asynchronous communication request buffer 15-1 in the CCU 5 to indicate whether the request is accepted or non-accepted.

Figure 5:
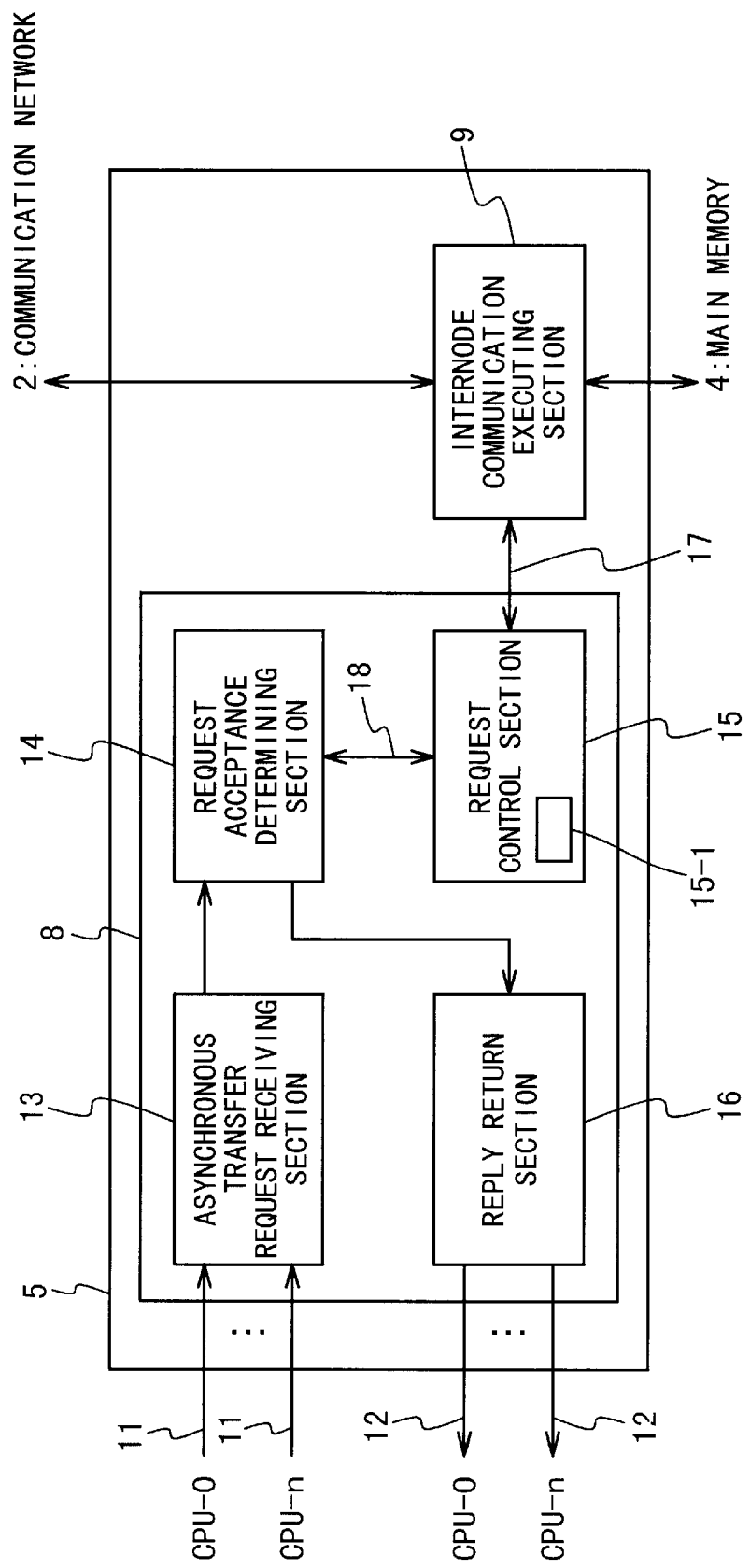
FIG. 5 is a circuit block diagram showing the structure of the communication control unit in the parallel processing system according to the embodiment of the present invention.

FIG. 5 shows the request control section 8 of the CCU 5 in detail. The request control section 8 is composed of an asynchronous communication request receiving section 13 to receive asynchronous communication requests 11 from the plurality of CPUs 3-0 to 3-n, respectively, and a request acceptance determining section 14, a request control section 15, and a reply return section 16.

The asynchronous communication request receiving section 13 has a function to receive the asynchronous communication request 11 from each CPU 3 in the node 1, and a function to transmit the asynchronous communication request 11 to the request acceptance determining section 14. When receiving the asynchronous communication requests 11 from the plurality of CPUs 3 at the same time, the asynchronous communication request receiving section 13 selects one of them in order and transmits to the request determining section 14.

The request acceptance determining section 14 determines whether or not it is possible to receive the asynchronous communication request 11 transmitted from the asynchronous communication request receiving section 13, based on request hold data of the request control section 15. The request acceptance determining section 14 transmits an acceptance signal to the reply return section 16 to notify the acceptance, when determining that the asynchronous communication request 11 is acceptable. When determining that the asynchronous communication request 11 is not acceptable, the request acceptance determining section 14 transmits a non-acceptance signal to the reply return section 16 to notify the non-acceptance. Also, the request acceptance determining section 14 discards the asynchronous communication request 11.

The request control section 15 receives the asynchronous communication request 11 determined to be acceptable by the request acceptance determining section 14 from the request acceptance determining section 14. The request control section 15 has a function to hold the request in the asynchronous communication request buffer 15-1 of the request control section 15 until the request control section 15 receives a request transmission request 17 from the internode communication executing section 9. Also, the request control section 15 has a function to notify that the request buffer 15-1 is full, to the request acceptance determining section 14 when the asynchronous communication request buffer 15-1 is full.

The request control section 15 takes out one of the asynchronous communication requests from the request buffer 15-1 in response to the request transmission request from the internode communication executing section 9 and outputs to the internode communication executing section 9. The internode communication executing section 9 executes the taken out asynchronous communication request. For example, the internode communication executing section 9 reads out data specified by the asynchronous communication request from the main memory 4 and transmits the read out data to another node.

The reply return section 16 has a function to return the acceptance signal or the non-acceptance signal notified from the request acceptance determining section 14 to the issuing CPU 3 as an acceptance reply or a non-acceptance reply 12.

Figure 6:
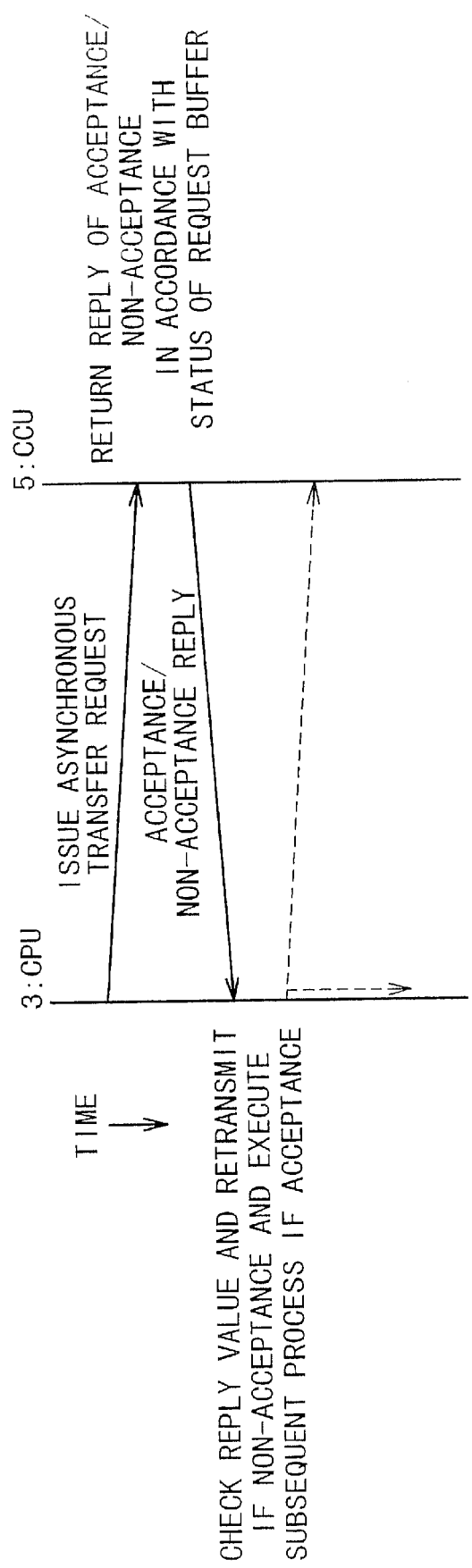
FIG. 6 is a sequence diagram showing permission and prohibition of the asynchronous communication in the parallel processing system according to the embodiment of the present invention.
Figure 7:
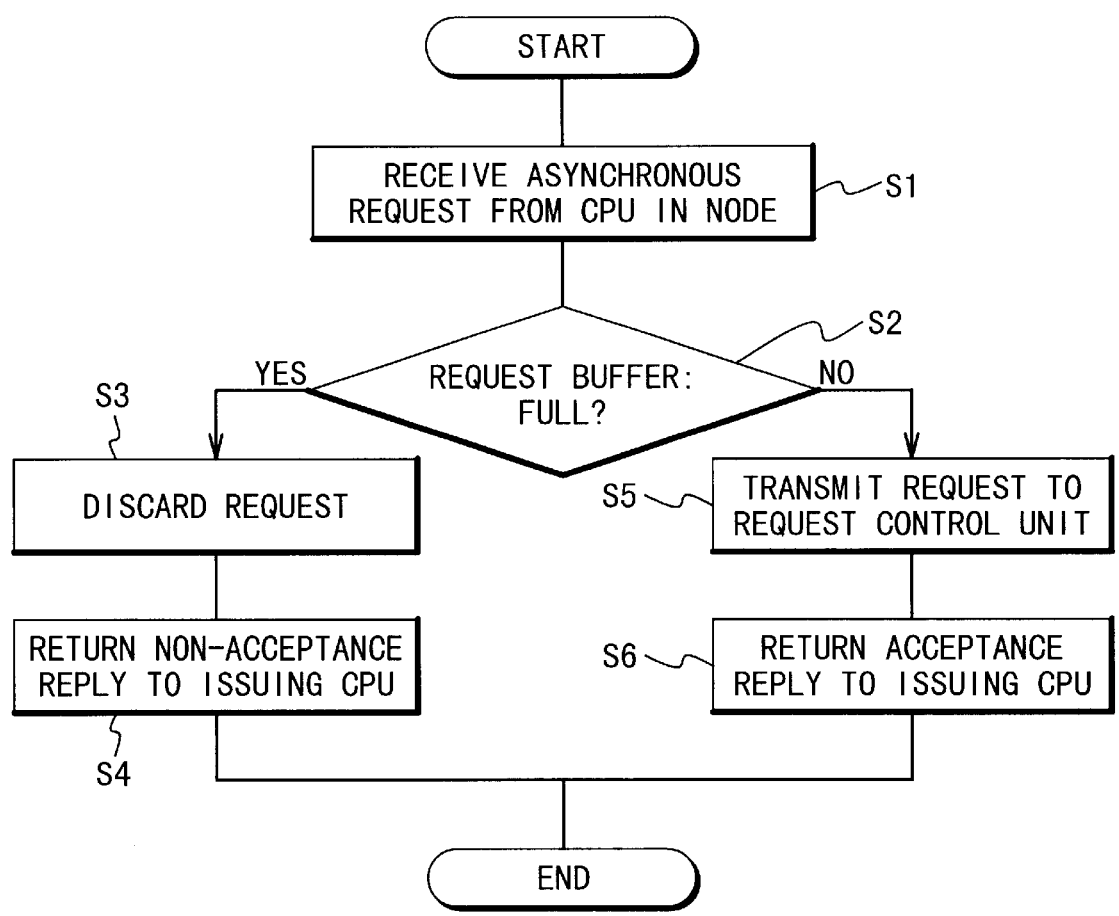
FIG. 7 is an operation flow diagram showing an operation of the parallel processing system according to the embodiment of the present invention.

As shown in FIG. 6, when issuing an asynchronous communication request 11 and sending out the asynchronous communication instruction to the CCU 5, the instruction issuing control section 6 of the CPU 3 enters a completion waiting state of the asynchronous communication instruction until a reply is returned from the CCU 5 to the reply receiving register 7. In this completion waiting state, it is necessary to restrain a process change on the CPU. Therefore, an interrupt prohibition state is set. The asynchronous communication request 11 sent out from the CPU is received by the asynchronous communication request receiving section 13 of the request control section 8 of the CCU 5, as shown in the step S1 of FIG. 7.

The asynchronous communication request receiving section 13 receives the asynchronous communication request 11 from each CPU in the node, and sends out them in order with the issuing CPU number to the request acceptance determining section 14. The request acceptance determining section 14 sends the asynchronous communication requests sent from the asynchronous communication request receiving section 13 to the request control section 15. The request acceptance determining section 14 determines whether or not the asynchronous communication request buffer 15-1 in the request control section 15 is full, based on request holding data. Thus, the request acceptance determining section 14 determines whether or not it is possible to accept the asynchronous communication request (Step S2). When the asynchronous communication request buffer 15-1 is not full, it is determined to be acceptable. The request acceptance determining section 14 notifies the issuing CPU number and the acceptance signal to the reply return section 16. When the asynchronous communication request buffer 15-1 is full, it is determined as non-acceptance and the issuing CPU number and the non-acceptance signal are notified to the reply return section 16 and the asynchronous communication request 11 is discarded (Step S3).

The request control section 15 receives the asynchronous communication request 11 determined to be acceptable by the request acceptance determining section 14 from the request acceptance determining section 14 (Step S5). Then, the request control section 15 holds the request in the asynchronous communication request buffer 15-1 until the request control section 15 receives the request transmission request 17 from the internode communication executing section 9. The request control section 14 notifies to the request acceptance determining section 14 that the buffer 15-1 is full, when the asynchronous communication request buffer 15-1 becomes full.

Figures 8A, 8B, 9:
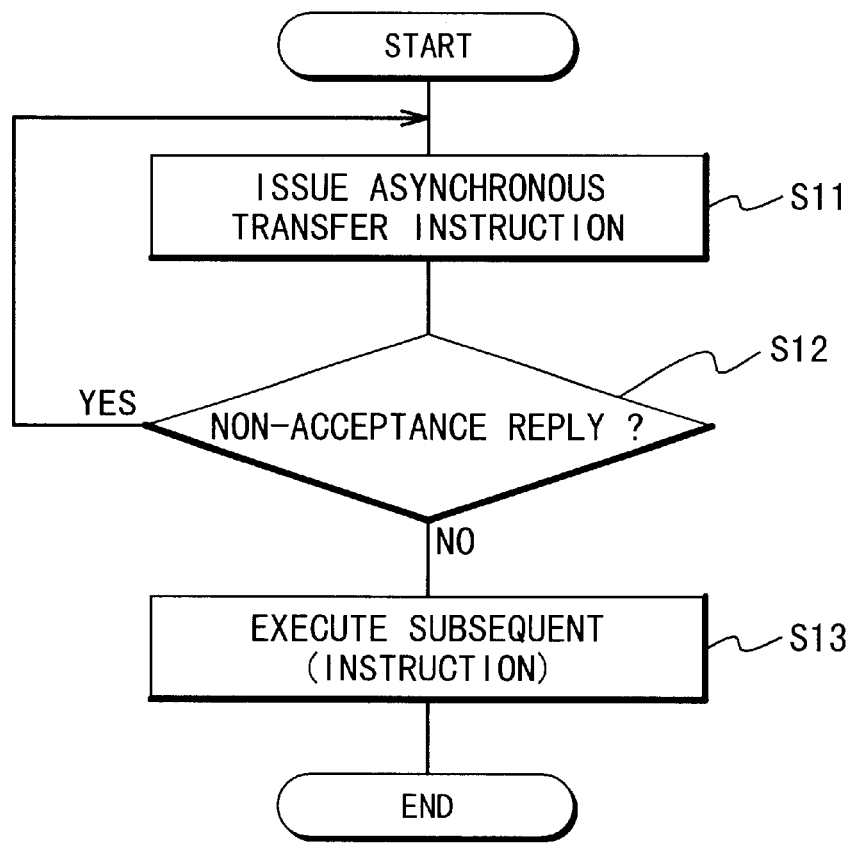
FIGS. 8A and 8B are an acceptance reply and a non-acceptance reply, respectively.
FIG. 9 is an operation flow diagram showing the parallel processing system according to the embodiment of the present invention.

The reply return section 16 returns the reply 12 indicating the acceptance or non-acceptance notified from the request acceptance determining section 14 to the issuing CPU (Step S4 or step S6). The reply 12 is returned to the issuing CPU is received by the reply receiving register 7. The instruction issuing control section 6 interprets the reply as the asynchronous communication instruction completion as shown in FIG. 9 (Step S11). Thus, the completion waiting state is released. As the subsequent process, a software process to have issued an asynchronous communication instruction checks based on the returned value stored in the reply receiving register whether the reply is an acceptance reply or a non-acceptance reply (Step S12).

FIGS. 8A and 8B exemplifies the acceptance reply 21 and the non-acceptance reply 22. When the returned value is the acceptance reply, the software process executes a subsequent program process (Step S13). In case of being the non-acceptance reply, the asynchronous communication instruction 11 is reissued (Step S11). As shown in FIG. 9, until the acceptance reply is returned, an asynchronous communication instruction sequence of the software process on the CPU is repeated. In this way, the problem of the hand-shaking system is solved that the flow control of the hand-shaking reply is not returned when the request buffer 15-1 in the request receiving end is full.

In the parallel processing system and the parallel processing method of the present invention, the problem of the hand-shaking system is solved that the flow control of the hand-shaking reply is not returned when the request buffer 15-1 in the request receiving end is full, and the use efficiency of the CPU is improved.

What is claimed is:

1. A parallel processing system comprising:
    a network; and
    a plurality of nodes which communicates asynchronously between said plurality of nodes through said network, and
    wherein each one of said plurality of nodes comprises
        a communication control unit connecting the one node to the network; and
        a plurality of CPUs, each of which CPUs acting as an issuing CPU generates and transmits an asynchronous communication request to the communication control unit of the one node, retransmits said asynchronous communication request in response to a non-acceptance reply, and executes a subsequent process in response to an acceptance reply, wherein,
        the communication control unit determines whether said asynchronous communication request, sent by an issuing CPU of the one node, is acceptable, returns said acceptance reply to said issuing CPU when said asynchronous communication request is acceptable, and returns said non-acceptance reply to said issuing CPU when said asynchronous communication request is not acceptable, and executes said asynchronous communication request.

2. The parallel processing system according to claim 1, wherein said communication control unit has a request buffer, and
    said communication control unit determines that said asynchronous communication request is acceptable, when said request buffer is not full, and determines that said asynchronous communication request is not acceptable, when said request buffer is full.

3. The parallel processing system according to claim 2, wherein said communication control unit stores said asynchronous communication request in said request buffer when said asynchronous communication request is acceptable.

4. The parallel processing system according to claim 2, wherein said communication control unit discards said asynchronous communication request when said asynchronous communication request is not acceptable.

5. The parallel processing system according to claim 1, wherein said issuing CPU enters a waiting mode after transmitting said asynchronous communication request to said communication control unit, and said issuing CPU is in an interrupt prohibition state in said waiting mode.

6. The parallel processing system according to claim 1, wherein said issuing CPU comprises:
   an instruction issuing control section which generates and transmits said asynchronous communication request to said communication control unit; and
   a reply receiving register which receives said acceptance reply or said non-acceptance reply from said communication control unit.

7. The parallel processing system according to claim 6, wherein said instruction issuing control section of said issuing CPU sets said issuing CPU to a waiting mode in which reception of an interrupt is prohibited, after transmitting said asynchronous communication request to said communication control unit, and
   said reply receiving register releases said waiting mode when said acceptance reply is received from said communication control unit.

8. The parallel processing system according to claim 2, wherein said communication control unit comprises:
   a request control section which determines whether said asynchronous communication request is acceptable, and returns said acceptance reply to said issuing CPU when said asynchronous communication request is acceptable, and said non-acceptance reply to said issuing CPU when said asynchronous communication request is not acceptable; and
   a communication executing section which receives said asynchronous communication request and executes said asynchronous communication request.

9. The parallel processing system according to claim 8, wherein said request control section comprises:
   a request receiving section which receives said asynchronous communication request from said issuing CPU;
   a determining section which determines whether said asynchronous communication request is acceptable; and
   a request control section which has said request buffer, and stores said asynchronous communication request in said request buffer when said asynchronous communication request is determined to be acceptable by said determining section.

10. A parallel processing method comprising a plurality of nodes, each one of which comprises a plurality of CPUs and a communication control unit, said parallel processing method comprising the steps of:
    (a) issuing an asynchronous communication request from one of said plurality of CPUs over the one node, as an issuing CPU, to the communication control unit of the one node;
    (b) setting said issuing CPU to a waiting state such that process change is prohibited, after the issuance;
    (c) determining, in said communication control unit of the one node, whether said asynchronous communication request is acceptable;
    (d) returning an acceptance reply from said communication control unit to said issuing CPU when said asynchronous communication request is acceptable; and
    (e) releasing said issuing CPU from said waiting state in response to said acceptance reply.

11. The parallel processing method according to claim 10, further comprising the step of:
    (f) executing a subsequent process in response to said acceptance reply.

12. The parallel processing method according to claim 10, further comprising the steps of:
    (g) returning a non-acceptance reply from said communication control unit to said issuing CPU when said asynchronous communication request is not acceptable; and
    (h) reissuing said asynchronous communication request from said issuing CPU to said communication control unit in response to said non-acceptance reply.

13. The parallel processing method according to claim 10, further comprising the step of:
    (i) executing said asynchronous communication request received from said communication control unit.

14. The parallel processing method according to claim 10, wherein said (c) determining step comprises the step of:
    determining that said asynchronous communication request is acceptable, when a request buffer in said communication control unit is not full; and
    storing said asynchronous communication request in said request buffer when said request buffer is not full.

15. The parallel processing method according to claim 12, wherein said (c) determining step comprises the step of:
    determining that said asynchronous communication request is not acceptable, when a request buffer in said communication control unit is full; and
    discarding said asynchronous communication request when a request buffer in said communication control unit is full.

16. A parallel processing system, comprising:
    a communications network (2); and
    a plurality of nodes (1), each one of the nodes comprising plural CPUs (3),
        a main memory (4) shared by the CPUs, and
        a communication control unit (5) comprising an asynchronous communication request buffer,
        the communication control unit being connected to each of the CPUs and to the main memory,
        the communication control unit connecting the CPUs to the communications network,
        the communications control unit controlling communication between the nodes, wherein,
            each CPU comprises i) an instruction issuing control section (6) for decoding operation instructions and for acting as an issuing CPU issuing asynchronous communication requests to the communication control unit of the one node to which the CPU is connected, and ii) a reply receiving register (7) for storing replies received from the communication control unit,
        the communication control unit comprises i) a request control section (8) for receiving an asynchronous communication request (11) from the instruction issuing control section of the issuing CPU in the one node and responsively returning one of an acceptance reply and a non-acceptance reply (12) to the reply receiving register of the issuing CPU, a selection of returning the acceptance reply or the non-acceptance reply being based on a state of the asynchronous communication request buffer and indicating whether the request is accepted or non-accepted, and ii) an internode communication executing section (9), the internode communication executing section executing internode communication and connecting the CPUs to the communication network.

17. The system of claim 16, wherein, the request control section comprises i) an asynchronous communication request receiving section (13) to receive the asynchronous communication requests from any of the CPUs, ii) a request acceptance determining section (14) receiving input from the asynchronous communication request receiving section, iii) a request control section (15) bidirectional communicating with the request acceptance determining section, and iv) a reply return section (16) receiving input from the request acceptance determining section, wherein, the asynchronous communication request receiving section transmitting the asynchronous communication request to the request acceptance determining section, the request acceptance determining section determining whether to receive the asynchronous communication request, transmitted from the asynchronous communication request receiving section, based on request hold data of the request control section, and the request acceptance determining section transmitting i) an acceptance signal to the reply return section to notify the acceptance, when determining that the asynchronous communication request is acceptable, and ii) a non-acceptance signal when determining that the asynchronous communication request is not acceptable, the request acceptance determining section also discarding the asynchronous communication request.

18. The system of claim 17, wherein, the request control section bidirectional connected to the internode communication executing section, the request control section, receiving the asynchronous communication request determined to be acceptable by the request acceptance determining section, holds the asynchronous communication request in the asynchronous communication request buffer, the request control section notifies the request acceptance determining section when the asynchronous communication request buffer is full, and the request control section outputs the asynchronous communication request from the request buffer to the internode communication executing section, in response to a request transmission request from the internode communication executing section.

19. The system of claim 18, wherein, the internode communication executing section executes the asynchronous communication request received from the request control section, and the asynchronous communication request is to read out data from the main memory and transmit the read out data to another node.

20. The system of claim 17, wherein, the reply return section returns the acceptance signal or the non-acceptance signal received from the request acceptance determining section to the reply receiving register of the issuing CPU as the acceptance reply or the non-acceptance reply, when the asynchronous communication request buffer is not full, the acceptance reply is sent to the issuing CPU by the reply return section, when the asynchronous communication request buffer is full, the non-acceptance is sent to the issuing CPU by the reply return section, the request control section holds the asynchronous communication request, determined to be acceptable by the request acceptance determining section, in the asynchronous communication request buffer until the request control section receives a request transmission request from the internode communication executing section, and the CPU, upon receiving the non-acceptance reply from the reply return section, reissues the asynchronous communication request to the request control section.

* * * * *